United States Patent

Fussnegger et al.

Patent Number: 5,505,973
Date of Patent: Apr. 9, 1996

[54] PROCESS FOR REMOVING ALUMINUM IONS FROM BEER OR FRUIT JUICE

[75] Inventors: Berhard Fussnegger, Kirrweiler; Juergen Detering, Limburgerhof, both of Germany

[73] Assignee: BASF Aktiengesellschaft, Ludwigshafen, Germany

[21] Appl. No.: 291,488

[22] Filed: Aug. 17, 1994

[30] Foreign Application Priority Data

Aug. 26, 1993 [DE] Germany ............... 43 28 669.0

[51] Int. Cl.⁶ ..................................... A23L 2/80
[52] U.S. Cl. ............... 426/422; 426/271; 426/330.4; 426/330.5; 426/424
[58] Field of Search ..................... 426/422, 271, 426/330.4, 330.5, 424

[56] References Cited

U.S. PATENT DOCUMENTS 3,878,310  4/1975  Field et al. ............... 426/422

FOREIGN PATENT DOCUMENTS

0438713A3  7/1991  European Pat. Off. .
1945749    4/1970  Germany .

OTHER PUBLICATIONS

Sharp et al. "Chemical Speciation, and Significance of aluminum in beer" 1995.

*Primary Examiner*—Donald E. Czaja
*Assistant Examiner*—Lien Tran
*Attorney, Agent, or Firm*—Oblon, Spivak, McClelland, Maier & Neustadt

[57] ABSTRACT

A process for removing aluminum ions from beer or juice, in which the beer or fruit juice is contacted with from 5 to 2500 g per 100 l of a polymer which contains, as copolymerized units, from 50 to 99.5% by weight of at least one basic vinyl heterocycle having a $pK_a$ of at least 3.8 and from 0 to 49.5% by weight of another copolymerizable monomer, and which was prepared in the absence of oxygen and polymerization initiators and in the presence of from 0.5 to 10% by weight, based on the monomers, of a crosslinker.

8 Claims, No Drawings

PROCESS FOR REMOVING ALUMINUM IONS FROM BEER OR FRUIT JUICE

FIELD OF THE INVENTION

The invention relates to the use of a polymer based on a basic vinyl heterocycle having a $pK_a$ of at least 3.8 for removing aluminum ions from beverages.

DESCRIPTION OF THE PRIOR ART

Aluminum contents of beverages can result, inter alia, from mineral-type processing aids, for example kieselguhr, perlites or bentonite with which the drinks were treated. Wine and wine-like beverages made from stone fruit, pome fruit and berries contain aluminum ions of natural origin, and/or from wine-making treatments, at concentrations of from 0.3 to >10 mg/l and these can cause undesirable color changes and haze, especially at relatively high concentrations. In beer, aluminum ion concentrations above 1 mg/l are likewise undesirable since haze can also result in this case.

According to the prior art, aluminum ions are removed from beverages by cation exchangers if these are permissible for beverages. Cation exchangers deliver ions to the beverage, changing its composition. This can have the most diverse undesirable consequences, such as changes in the pH, flavor and color.

SUMMARY OF THE INVENTION

It is an object of the present invention to develop an improved process for removing aluminum ions from beverages.

We have found that this object is achieved by a process for removing aluminum ions from beverages, which comprises treating the beverage with from 5 to 2500 g per 100 l of a polymer which contains, copolymerized, from 50 to 99.5% by weight of at least one basic vinyl heterocycle having a $pK_a$ of at least 3.8 and from 0 to 49.5% by weight of another copolymerizable monomer, and which was prepared in the absence of oxygen and polymerization initiators and in the presence of from 0.5 to 10% by weight, based on the monomers, of a crosslinker.

According to EP-A-4 38 713, the same polymers are used to remove heavy metals from wine and wine-like beverages. Surprisingly, these polymers can also be used for removing aluminum ions and these are in fact absorbed much more rapidly than heavy metals. This is of interest in particular for treating beer, but also for treating fruit juices. Wine and wine-like beverages can also be freed from aluminum ions in this manner.

The polymerization conditions are: absence of oxygen and polymerization initiators; presence of from 0.5 to 10, preferably from 1 to 4%, based on the total monomer weight, of a crosslinker; temperature in the range from 30° to 200°, preferably from 40° to 100° C.

DETAILED DESCRIPTION OF THE INVENTION AND PREFERRED EMBODIMENTS THEREOF

For the purposes of the invention, basic vinyl heterocycles are saturated and aromatically unsaturated heterocycles having a vinyl group and at least one basic tertiary ring nitrogen having a $pK_a$ of at least 3.8. Apart from the vinyl group, the ring can also carry alkyls having 1 to 4 carbons, phenyls or benzyls or a fused second ring. Examples are: N-vinylimidazole(VI) and derivatives such as 2-methyl-1-vinylimidazole, 4-methyl-1-vinylimidazole, 5-methyl-1-vinylimidazole, 2-ethyl-1-vinylimidazole, 2-propyl-1-vinylimidazole, 2-isopropyl-1-vinylimidazole, 2-phenyl-1-vinyl-imidazole and 1-vinyl-4,5-benzimidazole. Further examples which can be used are: 2-vinylpyridine, 4-vinylpyridine and 2-methyl-5-vinylpyridine. Clearly, mixtures of basic vinyl heterocycles can also be used.

Suitable crosslinkers are those which contain in the molecule two or more vinyl groups which can be copolymerized by a free radical mechanism. Particularly suitable compounds are alkylene bisacrylamides such as methylene bisacrylamide and N,N'-bisacryloylethylenediamine and moreover N,N'-divinylethyleneurea, N,N'-divinylpropyleneurea, ethylidene-bis-3-(N-vinylpyrrolidone) and 1,4-bis(N-vinyl-2-imidazolyl)butane and 1,4-bis(2-oxo-3-vinyl-1-imidazolidinyl)butane. Other useful crosslinkers are, for example, alkylene glycol di(meth)acrylates such as ethylene glycol di(meth)acrylate and tetramethylene glycol di(meth)acrylate, aromatic divinyl compounds such as divinylbenzene and divinyltoluene and allyl acrylate, divinyldioxane, pentaerythritol triallyl ether and mixtures thereof. When polymerization takes place in the presence of water, they are obviously only suitable if they are soluble in the aqueous monomer mixture.

The same clearly applies to the comonomers which can be copolymerized in amounts up to 49.5, preferably up to 40% by weight, based on the total monomer mixture. Examples of these which are useful are styrene, acrylic esters, vinyl esters, acrylamide, preferably N-vinyllactams such as 3-methyl-N-vinylpyrrolidone, in particular N-vinylcaprolactam and N-vinylpyrrolidone (VP).

To carry out the polymerization without solvent, the monomer mixture, composed of basic vinyl heterocycle, the crosslinker and with or without N-vinyllactam or another comonomer, is made inert by introducing nitrogen and is then heated to from 100 to 200, preferably from 150° to 180° C. It is advantageous if a gentle nitrogen stream is further introduced into the mixture. It is particularly advantageous if the batch is brought to boil by applying vacuum. Depending on the type of monomers used and the temperature chosen, the mixture then polymerizes within 1 to 20 hours. For example, in the polymerization of 2-methyl-1-vinylimidazole with 2% of N,N'-divinylethyleneurea at 150° C. with stirring by a powerful stirrer and at a pressure of 310 mbar, after 2.5 h, the first polymer particles form which slowly increase until after 10 h the batch is composed of a brownish powder. After washing with water and drying, the new polymer is obtained in yields of above 90% in the form of a coarse powder.

A preferred method of preparation is precipitation polymerization in water. The concentration of the monomers in the reaction batch is expediently chosen in such a way that the batch remains easily stirrable over the entire reaction period. If too little water is used, the polymer grains become sticky so that stirring is more difficult than in the complete absence of water. With conventional stirred tanks, the expedient monomer concentration, based on the aqueous mixture, is approximately from 5 to 30, preferably from 8 to 15, % by weight. It can be increased to 50% by weight if powerful stirrers are available. It can also be expedient to begin the polymerization with a relatively concentrated solution and then to dilute this with water in the course of the reaction. The polymerization is expediently carried out at pH's above 6, in order to avoid possible hydrolysis of the comonomers and/or crosslinkers. The pH can be adjusted by addition of small amounts of bases such as sodium hydroxide or ammonia or the conventional buffer salts such as soda, sodium hydrogencarbonate or sodium phosphate. Oxygen can be excluded by keeping the polymerization batch at the boil and/or, as mentioned, with the aid of an inert gas such as nitrogen. Polymerization can take place at from 30° to 150° C., preferably at from 40° to 100° C.

It can occasionally be advantageous, for the complete removal of dissolved oxygen, to add small amounts—from 0.01 to 1% by weight, based on the monomer mixture—of a reducing agent such as sodium sulfite, sodium pyrosulfite, sodium dithionite, ascorbic acid and the like before or at the beginning of the polymerization.

In a particularly preferred embodiment of the precipitation polymerization, the water-soluble comonomer (preferably NVP or an N-vinyllactam), some of the crosslinker, water with or without a buffer and a reducing agent are heated in a gentle nitrogen stream until the first polymer particles appear. A mixture of the vinyl heterocycle and the remaining crosslinker with or without water as diluent and previously rendered inert by blowing nitrogen through it is then added in the course of from 0.2 to 6 hours.

The beginning of the polymerization can frequently be accelerated by addition of from 0.01 to 5% by weight, based on the monomer mixture, of a crosslinked sparingly swellable polymer based on basic vinyl heterocycles having a $pK_a$ of at least 3.8 or vinyllactams, in particular N-vinylimidazole and N-vinylpyrrolidone.

The resulting polymer can be isolated from the aqueous suspension by filtering or centrifuging with subsequent washing with water and drying in conventional dryers such as a forced circulation drying cabinet or vacuum drying cabinet, paddle dryer or pneumatic conveying dryer.

The beverage treatment according to the invention is contacting the beverage with the polymer for at least one minute, preferably for at least one hour. This can be carried out batchwise by adding the polymer to the beverage and separating it off, or continuously on a column packed with the polymer, a filter sheet containing the polymer or a membrane containing the polymer, as described in principle, for example, in DE-A-41 19 288. The polymer can also be added to the beverage on the retentate side or permeate side in membrane-based filtrations. The usage rate of the polymers as sorbents does not depend solely on the initial aluminum ion concentration and the desired final concentration, but also on the time available for the process and is in the range of from 5 to 2500, preferably from 10 to 250 g/100 l of aqueous liquid. As the use examples show, even after surprisingly short contact times there is a marked reduction in the aluminum ion concentration. However, longer residence times further increase the efficiency of the polymers usable according to the invention.

The polymer powder has neutral taste and odor and is very easily filterable. The sensory quality of the beverages is unchanged when they are clarified with these polymers. Beer retains its characteristic varietally typical aroma. Regeneration of the sorbents (polymers) is possible without problem by treatment with dilute acids, preferably mineral acids.

Although the polymers usable according to the invention are prepared with the addition of only very small amounts of crosslinker (preferably 1–4 %, based on the total weight of the monomers used), they are only sparingly swellable in water. They do not form gels. In contrast thereto, crosslinked polymers of the gel type are obtained when the abovementioned monomers are polymerized in aqueous solution in the presence of an initiator and a crosslinker. The degree of crosslinking and thus the swelling behavior is substantially dependent in this case on the amount of crosslinker added. In order to prepare a polymer of the gel type which has the same swelling behavior as the polymers useful according to the invention, an amount of crosslinker above 20% by weight is required. These highly crosslinked gels, because of their morphology, have a significantly poorer sorption capacity compared with aluminum ions than the porous polymers usable according to the invention. Polymers of the gel type having a crosslinker content below 5% swell highly intensively. Such intensively swellable polymers have serious disadvantages with respect to production, general handling and use: they block the reaction vessel, can be neither stirred nor poured, and drying requires the evaporation of large amounts of solvent. They must be preswollen for use and are not pourable in this state. They show an unsatisfactory precoat behavior on the filter sheet and do not form a porous filter cake. They are thus not easily filterable in contrast to the polymers usable according to the invention. In addition, columns which are packed with the polymers of the gel type, have a tendency to block. In membranes, the polymers of the gel type are not usable, in contrast to the polymers usable according to the invention.

The polymers of a basic vinyl heterocycle, to be used according to the invention, can also be used together with a popcorn polymer or popcorn copolymer of vinylpyrrolidone (VP), if, in addition to aluminum ions (with or without heavy metal ions), polyphenols are also to be removed from the beverage (beer or wine).

In the examples, parts and percentages are by weight. The polymers used in Examples 1 and 2a were prepared from 90% by weight of vinylimidazole (VI), 7% of vinylpyrrolidone (VP) and 3% of N,N'-divinylethyleneurea. For Example 2b, a polymer of the following composition was used:

64% of VI, 33% of VP and 3% of N,N'-divinylethyleneurea.

In Example 3c, the polymer contained 78% of VI, 19% of VP and 3% of N,N'-divinylethyleneurea.

EXAMPLE 1

Removal of aluminum from beer

Test beer: Mayer Bräu Export Urtyp

|  | Contact time [min] | Dissolved aluminum content [mg/l] |
|---|---|---|
| O Sample (initial value) | 0 | 0.55 |
| fortified sample | 0 | 2.60 |
| 50 g of polymer per hectoliter in each case | 1 | 1.20 |
|  | 2 | 1.00 |
|  | 3 | 0.80 |
|  | 4 | 0.70 |
|  | 5 | 0.55 |
|  | 7 | 0.45 |
|  | 10 | 0.35 |
|  | 20 | 0.20 |
|  | 30 | 0.15 |
|  | 40 | 0.15 |
|  | 60 | 0.10 |
| 80 g of polymer per hectoliter in each case | 1 | 0.65 |
|  | 2 | 0.45 |
|  | 3 | 0.30 |
|  | 4 | 0.25 |
|  | 5 | 0.25 |
|  | 7 | 0.20 |
|  | 10 | 0.15 |
|  | 20 | 0.15 |
|  | 30 | 0.10 |
|  | 40 | 0.10 |
|  | 60 | 0.10 |

EXAMPLE 2

Removal of aluminum from fruit juices (pH 3.36)

| | Contact time [min] | Dissolved aluminum content [mg/l] |
|---|---|---|
| a) Grape juice (white) | | |
| Native sample | 0 | 1.90 |
| fortified sample | 0 | 5.20 |
| | 1 | 3.60 |
| | 3 | 2.90 |
| | 5 | 2.50 |
| 50 g of polymer per | 10 | 2.00 |
| hectoliter in each | 20 | 1.40 |
| case | 30 | 1.10 |
| | 45 | 0.90 |
| | 60 | 0.70 |
| b) Grape juice (white) | | |
| Native sample | 0 | 1.90 |
| fortified sample | 0 | 7.30 |
| | 1 | 5.50 |
| | 3 | 5.20 |
| | 5 | 4.60 |
| 50 g of polymer per | 10 | 3.80 |
| hectoliter in each | 20 | 3.10 |
| case | 30 | 2.60 |
| | 45 | 2.20 |
| | 60 | 1.90 |
| c) Apple juice | | |
| Native sample | 0 | 1.80 |
| fortified sample | 0 | 5.00 |
| | 1 | 3.80 |
| | 3 | 3.40 |
| 50 g of polymer per | 5 | 2.80 |
| hectoliter in each | 10 | 2.40 |
| case | 20 | 2.00 |
| | 30 | 1.80 |
| | 45 | 1.70 |
| | 60 | 1.70 |

We claim:

1. A process for removing aluminum ions from beer or fruit juice, which comprises contacting the beverage with from 5 to 2500 g per 100 l of a polymer which contains, as copolymerized units, from 50 to 99.5% by weight of at least one basic vinyl heterocycle having a $pk_a$ of at least 3.8 and from 0 to 49.5% by weight of another copolymerizable monomer and which was prepared in the absence of oxygen and polymerization initiators and in the presence of from 0.5 to 10% by weight, based on the monomers, of a crosslinker; and then separating said polymer from said beer or fruit juice.

2. A process as claimed in claim 1, wherein said basic vinyl heterocycle is N-vinylimidazole or 2-methyl-1-vinylimidazole or a mixture of both.

3. A process as claimed in claim 1, wherein said monomer is N-vinylpyrrolidone or N-vinylcaprolactam or a mixture of both.

4. A process as claimed in claim 1, wherein said crosslinker is N,N'-di-vinylethyleneurea.

5. A process as claimed in claim 1, wherein said polymer is prepared in the presence of a reducing agent.

6. A process as claimed in claim 1, wherein said polymer is prepared in the presence of water at a temperature of from 30+ to 150° C.

7. A process as claimed in claim 1, wherein said polymer is prepared without a solvent at a temperature of from 100° to 200° C.

8. A process as claimed in claim 1, wherein said polymer is a component of a filter sheet or membrane.

* * * * *